(12) United States Patent
Yetukuri et al.

(10) Patent No.: US 7,484,808 B2
(45) Date of Patent: Feb. 3, 2009

(54) VISION IMPROVING SYSTEM FOR A HEAD RESTRAINT

(75) Inventors: Nagarjun V. Yetukuri, Rochester Hills, MI (US); Gerald S. Locke, Lake Orion, MI (US); Thomas J. Fowler, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 369 days.

(21) Appl. No.: 10/907,503

(22) Filed: Apr. 4, 2005

(65) Prior Publication Data
US 2006/0220433 A1   Oct. 5, 2006

(51) Int. Cl.
*A47C 7/36* (2006.01)

(52) U.S. Cl. .................. 297/408; 297/410; 297/403

(58) Field of Classification Search .......... 297/408, 297/410, 61, 403
See application file for complete search history.

(56) References Cited

U.S. PATENT DOCUMENTS

| | | | |
|---|---|---|---|
| 2,985,229 A | 5/1961 | Shamblin |
| 4,623,166 A | 11/1986 | Andres et al. |
| 4,637,655 A | 1/1987 | Fourrey et al. |
| 4,671,573 A | 6/1987 | Nemoto et al. |
| 4,682,817 A | 7/1987 | Freber |
| 4,834,456 A | 5/1989 | Barros et al. |
| 4,935,680 A | 6/1990 | Sugiyama |
| 4,977,973 A | 12/1990 | Takizawa |
| 5,052,754 A | 10/1991 | Chinomi |
| 5,071,190 A | 12/1991 | Tame |
| 5,145,233 A | 9/1992 | Nagashima |
| 5,433,503 A | 7/1995 | De Filippo |
| 5,540,479 A | 7/1996 | Thomas et al. |
| 5,590,933 A | 1/1997 | Andersson |
| 5,628,543 A | 5/1997 | Filipovich et al. |
| 5,669,668 A | 9/1997 | Leuchtmann |
| 5,681,079 A | 10/1997 | Robinson |
| 5,700,054 A | 12/1997 | Lang |
| 5,704,685 A | 1/1998 | Handa et al. |
| 6,000,760 A | 12/1999 | Chung |
| 6,050,633 A | 4/2000 | Droual |
| 6,074,011 A | 6/2000 | Ptak et al. |
| 6,192,565 B1 | 2/2001 | Tame |
| 6,447,068 B1 | 9/2002 | Anderson et al. |
| 6,508,512 B2 | 1/2003 | Saberan et al. |
| 6,550,865 B2 | 4/2003 | Cho |
| 6,572,188 B2 | 6/2003 | Ozawa |

(Continued)

FOREIGN PATENT DOCUMENTS

DE       3020558 A1    12/1981

(Continued)

*Primary Examiner*—Anthony D. Barfield
(74) *Attorney, Agent, or Firm*—Brooks Kushman P.C.

(57) ABSTRACT

A vehicle seat assembly that is disposable in a vehicle rearward of a front seat includes a seat bottom, a seat back attached to the seat bottom, and a head restraint attached to the seat back and having a head restraint body that is moveable from a raised position to a lowered position. The seat assembly further includes an actuator associated with the head restraint for enabling movement of the head restraint body from the raised position to the lowered position. The actuator is located proximate a front portion of the seat bottom such that the actuator is accessible by an occupant of the front seat when the seat assembly is installed in the vehicle.

22 Claims, 4 Drawing Sheets

U.S. PATENT DOCUMENTS

| | | |
|---|---|---|
| 6,612,653 B2 | 9/2003 | Takata |
| 6,616,236 B1 | 9/2003 | Su |
| 6,789,845 B2 | 9/2004 | Farquhar et al. |
| 6,860,564 B2 | 3/2005 | Reed et al. |
| 6,935,696 B2 | 8/2005 | Gauthier et al. |
| 6,955,397 B1 | 10/2005 | Humer |
| 7,044,544 B2 | 5/2006 | Humer et al. |
| 7,118,171 B2 | 10/2006 | Fowler et al. |
| 7,178,865 B2 | 2/2007 | Yetukuri et al. |
| 7,325,877 B2 | 2/2008 | Brockman et al. |
| 2003/0015898 A1 | 1/2003 | Breed |
| 2004/0036329 A1 | 2/2004 | Ashton et al. |
| 2004/0061362 A1 | 4/2004 | Farquhar et al. |
| 2004/0195872 A1 | 10/2004 | Svantesson |
| 2005/0140198 A1 | 6/2005 | Ashton et al. |
| 2005/0156456 A1 | 7/2005 | Robinson et al. |
| 2005/0225146 A1 | 10/2005 | Sutter, Jr. et al. |
| 2005/0242640 A1 | 11/2005 | Barko et al. |
| 2005/0248198 A1 | 11/2005 | Fowler et al. |
| 2006/0071517 A1 | 4/2006 | Humer et al. |
| 2006/0103189 A1 | 5/2006 | Humer et al. |
| 2006/0103190 A1 | 5/2006 | Humer et al. |
| 2006/0162076 A1 | 7/2006 | Bartlett et al. |
| 2006/0163928 A1 | 7/2006 | Droche |
| 2007/0296260 A1 | 12/2007 | Stossel |

FOREIGN PATENT DOCUMENTS

| | | |
|---|---|---|
| DE | 3436509 A1 | 4/1986 |
| DE | 3843624 A1 | 7/1989 |
| JP | 11-20528 A | 1/1999 |

VISION IMPROVING SYSTEM FOR A HEAD RESTRAINT

BACKGROUND OF THE INVENTION

1. Field of the Invention

The invention relates to a seat assembly having a moveable head restraint body.

2. Background Art

A seat assembly may include a head restraint cushion pivotally attached to a seat back such that the head restraint cushion is moveable between a raised position and a lowered position. The head restraint cushion may be pivoted to the lowered position by pulling on a strap extending from the head restraint cushion.

In another known rear seat assembly, an electronic mechanism is provided for pivoting a head restraint cushion with respect to a seat back. This assembly further includes a push button disposed between two front seat assemblies, or on an overhead console, for activating the electronic mechanism.

SUMMARY OF THE INVENTION

Under the invention, a vehicle seat assembly that is disposable in a vehicle rearward of a front seat is provided. The seat assembly includes a seat bottom, a seat back attached to the seat bottom, and a head restraint attached to the seat back and including a head restraint body that is moveable from a raised position to a lowered position. The seat assembly further includes an actuator associated with the head restraint for enabling movement of the head restraint body from the raised position to the lowered position. The actuator is located proximate a front portion of the seat bottom such that the actuator is accessible by an occupant of the front seat when the seat assembly is installed in the vehicle.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION OF THE PREFERRED EMBODIMENT(S)

Figure 1:
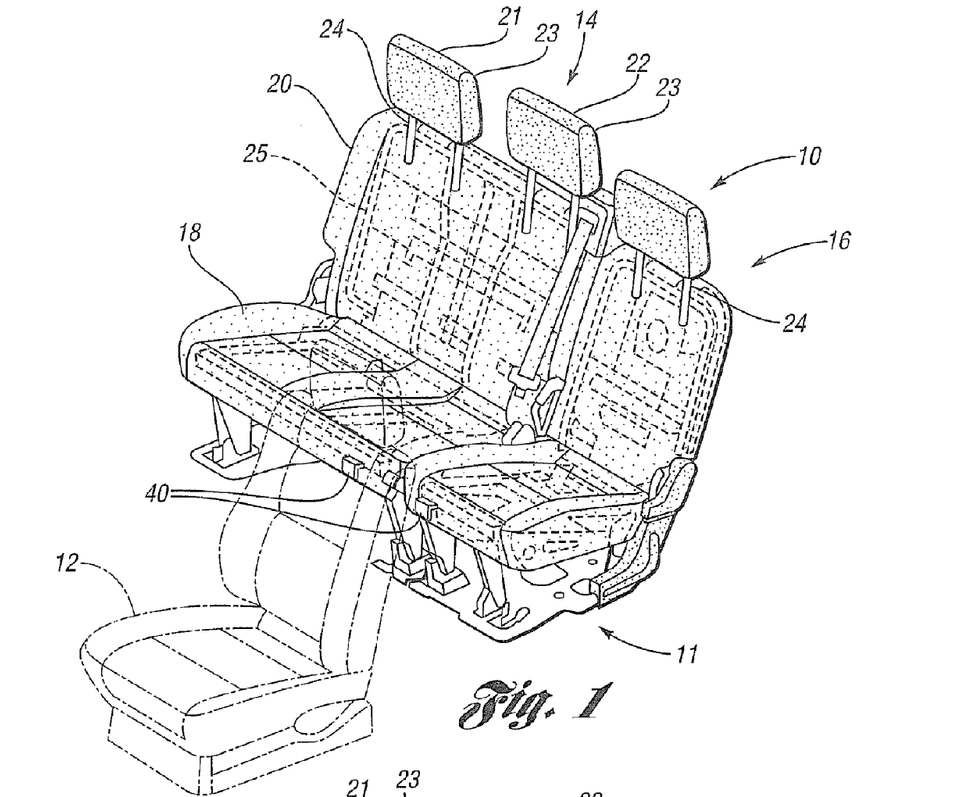
FIG. 1 is a perspective view of a seat arrangement according to the invention, including first and second seat assemblies disposed behind a driver seat, wherein each seat assembly includes a seat bottom, a seat back attached to the seat bottom, and one or more head restraints attached to the seat back, wherein each head restraint includes a head restraint body that is pivotable with respect to the seat back.
Figure 2:
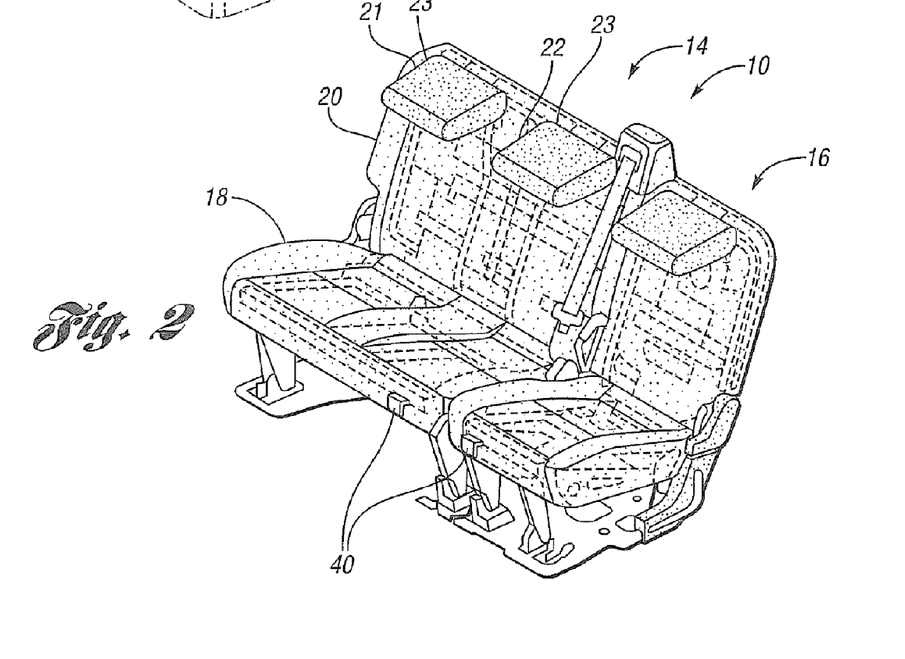
FIG. 2 is a perspective view of the seat arrangement of FIG. 1 showing each head restraint body in a lowered position.

FIGS. 1 and 2 show a seat arrangement 10 according to the invention for use with a motor vehicle 11 and disposable rearward of one or more front row seats, such as a driver seat 12 and/or passenger seat (not shown). In the embodiment shown in FIGS. 1 and 2, the seat arrangement 10 includes a passenger side seat assembly 14 that is configured to support two seat occupants, and a driver side seat assembly 16 that is configured to support one seat occupant. Alternatively, each seat assembly 14 and 16 may be configured to support one or more seat occupants.

A detailed description will now be provided for the seat assembly 14, with the understanding that the seat assembly 16 may have the same or similar construction. The seat assembly 14 includes a seat bottom 18, a seat back 20 pivotally attached to the seat bottom 18, and first and second head restraints 21 and 22, respectively, attached to the seat back 20 such that at least a portion of each head restraint 21 and 22 is moveable with respect to the seat back 20. For example, the head restraints 21 and 22 may each include a head restraint body 23, such as a head restraint cushion, that is pivotally attached to one or more head restraint support members, such as posts 24, which are fixedly or moveably attached to seat back frame 25 of the seat back 20. As another example, the support posts 24 of each head restraint 21 and 22 may be pivotally attached directly to seat back frame 25. The head restraint bodies 23 are each moveable between a raised position shown in FIG. 1 and a lowered position shown in FIG. 2 for improving rearward vision of an occupant of the driver seat.

Figures 3, 4, 5:
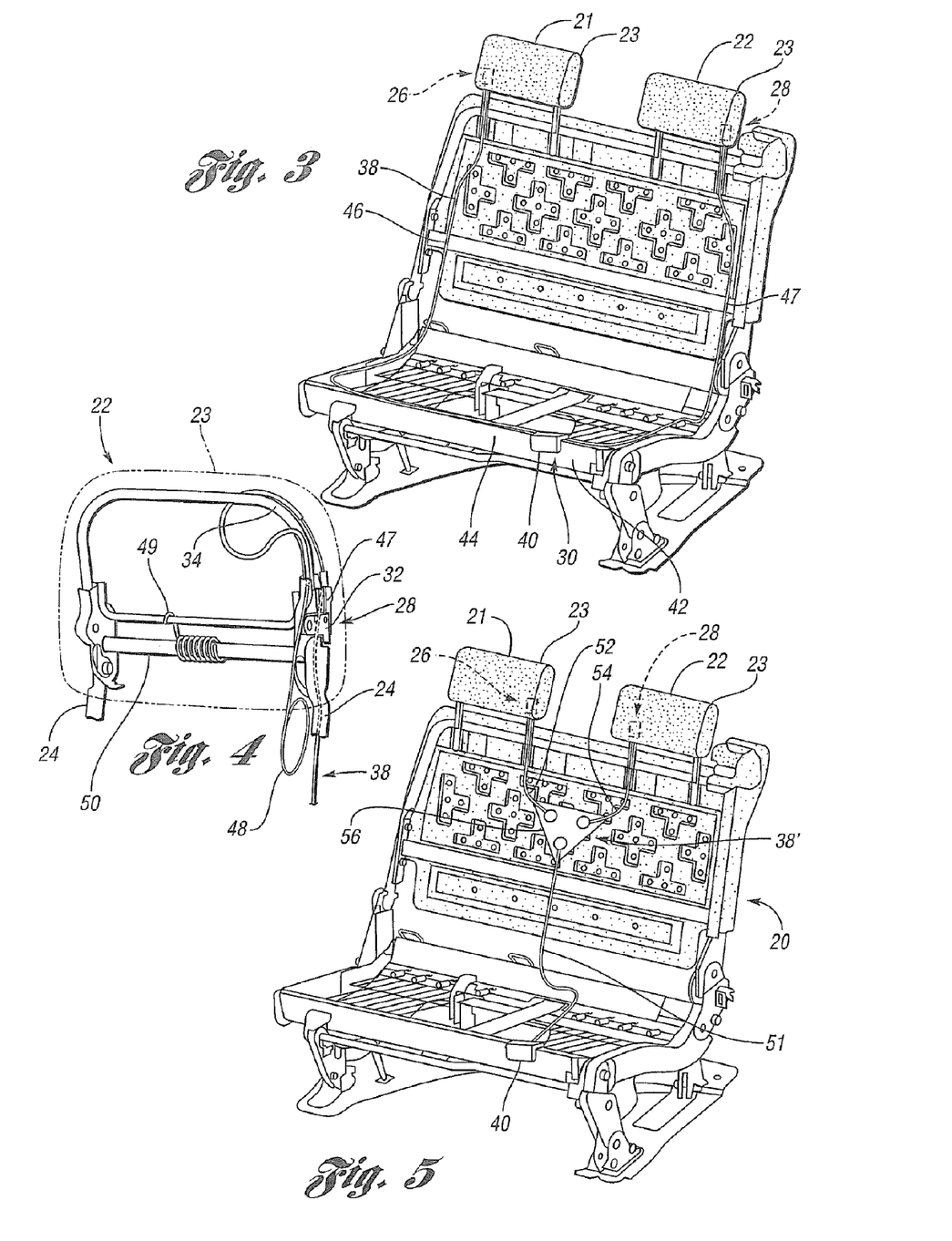
FIG. 3 is a perspective view of the first seat assembly, which includes locking mechanisms associated with the head restraints and a release mechanism connected to the locking mechanisms for releasing the locking mechanisms.
FIG. 4 is an enlarged perspective view of a portion of the first seat assembly showing an exemplary locking mechanism.
FIG. 5 is a perspective view similar to FIG. 3 showing an alternative configuration for the release mechanism.

Referring to FIG. 3, the seat assembly 14 further includes first and second locking mechanisms 26 and 28, respectively, associated with the first and second head restraints 21 and 22, respectively, for maintaining the head restraint bodies 23 in the raised positions. The locking mechanisms 26 and 28 are shown schematically in FIG. 3 disposed within the head restraint bodies 23. In addition, the seat assembly 14 includes a release mechanism 30 connected to the locking mechanisms 26 and 28 for releasing the locking mechanisms 26 and 28 to enable the head restraint bodies 23 to move toward the lowered positions.

Each locking mechanism 26 and 28 may have any suitable configuration for maintaining the associated head restraint body 23 in the raised position. Referring to FIG. 4, for example, an exemplary configuration is shown for the second locking mechanism 28. It is to be understood that the first locking mechanism 26 may have the same or similar configuration.

In the embodiment shown in FIG. 4, the second locking mechanism 28 includes a locking member 32, such as a locking cam, that is mounted on a head restraint frame 34 that supports the head restraint body 23 of the second head restraint 22. The locking member 32 is engageable with a support post 24 of the second head restraint 22 to inhibit movement of the frame 34. The locking mechanism 28 may further include a spring member (not shown) engaged with the locking member 32 for urging the locking member 32 into engagement with the support post 24.

Referring to FIGS. 3 and 4, the release mechanism 30 includes a connector arrangement 38, such as cable arrangement, connected to the locking mechanisms 26 and 28, and an actuator 40 connected to the connector arrangement 38. The actuator 40, which may be a lever, strap, knob, or push button for example, is located proximate a front portion 42 of the seat bottom 18 such that the actuator 40 is accessible by an occupant of the driver seat 12 and/or other front row seat. In the embodiment shown in FIG. 3, for example, the actuator 40 is mounted on, or otherwise disposed proximate to, a front portion of seat bottom frame 44.

In the embodiment shown in FIG. 3, the connector arrangement 38 includes first and second connectors, such as first and second sheathed cables 46 and 47, respectively, that extend between the actuator 40 and the first and second locking mechanisms 26 and 28, respectively. Furthermore, each cable 46 and 47 may pass through a respective support post 24, or along side the respective support post 24, for example.

Referring to FIGS. 3 and 4, when the actuator 40 is actuated, the cables 46 and 47 disengage the locking mechanisms 26 and 28 and allow the head restraint bodies 23 of the head restraints 21 and 22 to move toward the lowered positions. For example, if the actuator 40 is configured as a lever or strap, and the locking member 32 of each locking mechanism 26 and 28 is configured as a pivotable locking cam, the actuator 40 may be pulled to thereby cause the cables 46 and 47 to pivot the locking members 32 and disengage the locking members 32 from the support posts 24.

In the embodiment shown in FIG. 4, the second head restraint 22 also includes a pull member, such as a strap 48, connected to the second locking mechanism 28 and extending beyond an exterior surface of the head restraint body 23 for manually releasing the second locking mechanism 28. For example, the strap 48 may be connected to the second cable 47 with an additional cable. With such a configuration, the second locking mechanism 28 may be released using the strap 48 or the actuator 40.

The release mechanism 30 may also be configured to selectively release the locking mechanisms 26 and 28. For example, by varying the lengths of the cables 46 and 47, such as by making the second cable 47 shorter than the first cable 46, a relatively short first movement or stroke of the actuator 40 may result in the release of the second locking mechanism 28, and a relatively short second movement or stroke of the actuator 40 may result in the release of the first locking mechanism 26. However, a relatively large movement or stroke of the actuator 40 may result in the release of both locking mechanisms 26 and 28.

Each head restraint 21 and 22 may further include a spring member 49 associated with each head restraint body 23 for urging the head restraint bodies 23 toward the lowered positions. Referring to FIG. 4, for example, each spring member 49 may be engaged with a head restraint frame 34 and a pivot member 50 of a respective head restraint 21, 22. With such a configuration, the spring members 49 function to move the head restraint bodies 23 of the head restraints 21 and 22 toward the lowered positions after the locking mechanism 26 and 28 have been released. The head restraint bodies 23 may then be returned to the raised positions by manually pushing the head restraint bodies 23 toward the raised positions until the locking mechanisms 26 and 28 re-engage.

Referring to FIG. 5, an alternative embodiment 38' of the connector arrangement is shown. The connector arrangement 38' includes a main connector, such as main cable 51, extending from the actuator 40 to the seat back 20, and first and second branch connectors, such as first and second branch cables 52 and 54, respectively, connected to the main cable 51 via connector member 56. The first and second branch cables 52 and 54, respectively, are also connected to the first and second locking mechanisms 26 and 28, respectively. Alternatively, the release mechanism 30 may be provided with any suitable connector arrangement for connecting the actuator 40 to the locking mechanisms 26 and 28.

Figure 6:
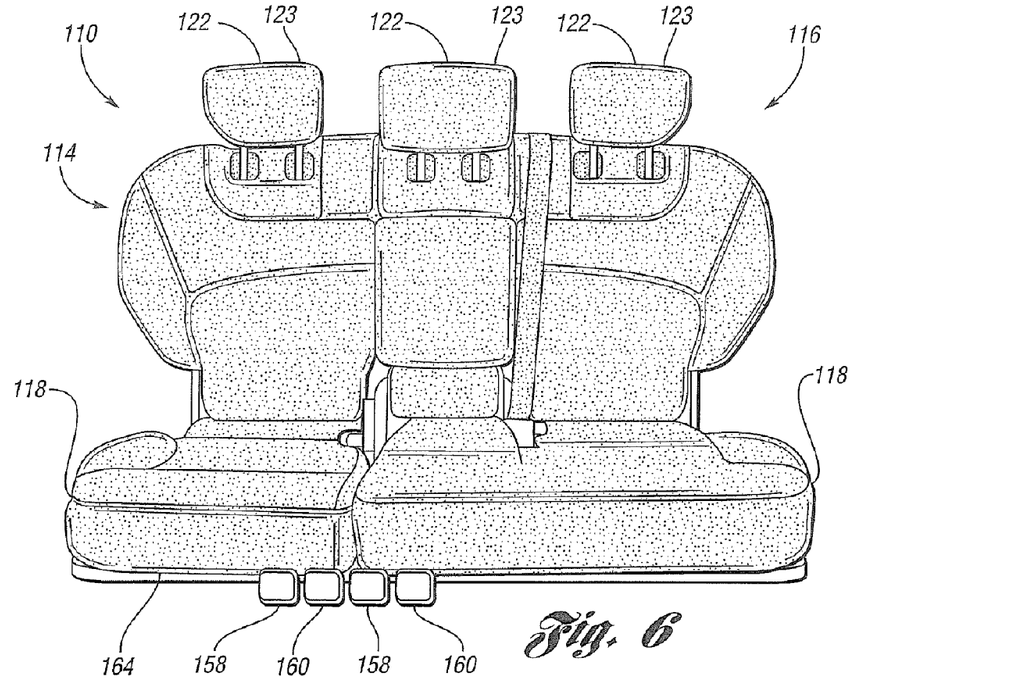
FIG. 6 is a perspective view of a second embodiment of the seat arrangement including first and second seat assemblies that each include a seat bottom, a seat back attached to the seat bottom, and one or more head restraints attached to the seat back, each head restraint including a head restraint body that is moveable generally linearly with respect to the seat back, wherein each head restraint is shown in a raised position.
Figure 7:
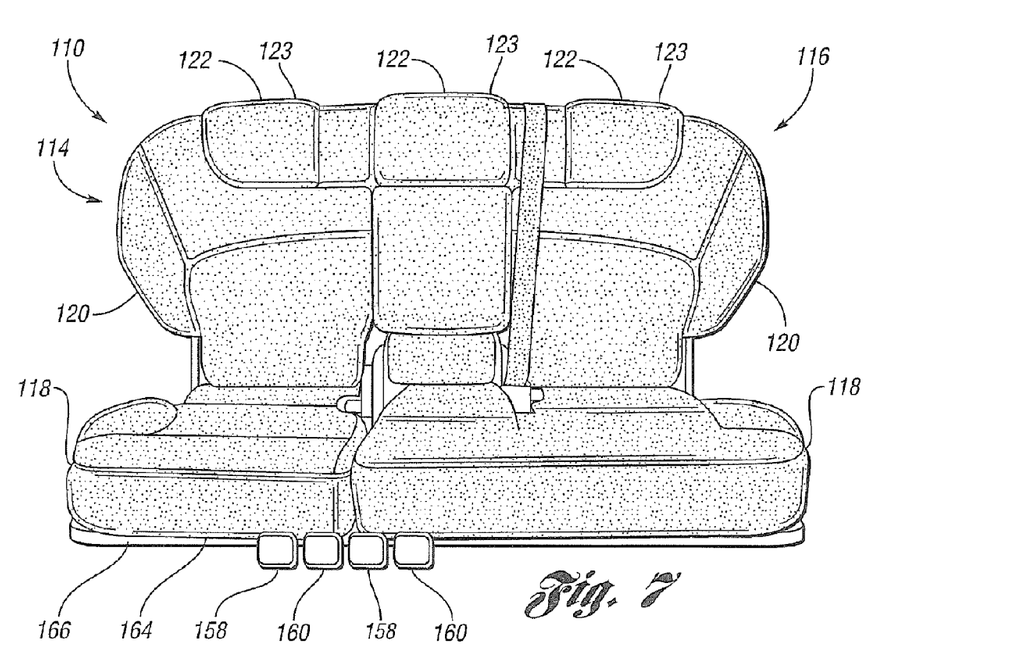
FIG. 7 is a perspective view of the seat arrangement of FIG. 6, wherein each head restraint body is shown in a lowered position.

Referring to FIGS. 6 and 7, a second embodiment 110 of the seat arrangement is shown for use with a motor vehicle and disposable rearward of one or more front row seats, such as a driver seat and/or passenger seat. In this embodiment, the seat arrangement 110 includes a passenger side seat assembly 114 that is configured to support one seat occupant, and a driver side seat assembly 116 that is configured to support two seat occupants. Alternatively, each seat assembly 114 and 116 may be configured to support one or more seat occupants.

Each seat assembly 114 and 116 includes a seat bottom 118, a seat back 120 pivotally attached to the seat bottom 118, and one or more head restraints 122 attached to the seat back 120 such that at least a portion of each head restraint 122 is moveable with respect to the seat back 120. For example, the head restraints 122 may be slidably attached to the seat backs 120 such that head restraint bodies 123 of the head restraints 122 are each moveable generally linearly, such as generally vertically, between a raised position shown in FIG. 6 and a lowered position shown in FIG. 7 for improving rearward vision of an occupant of the driver seat.

Figure 8:
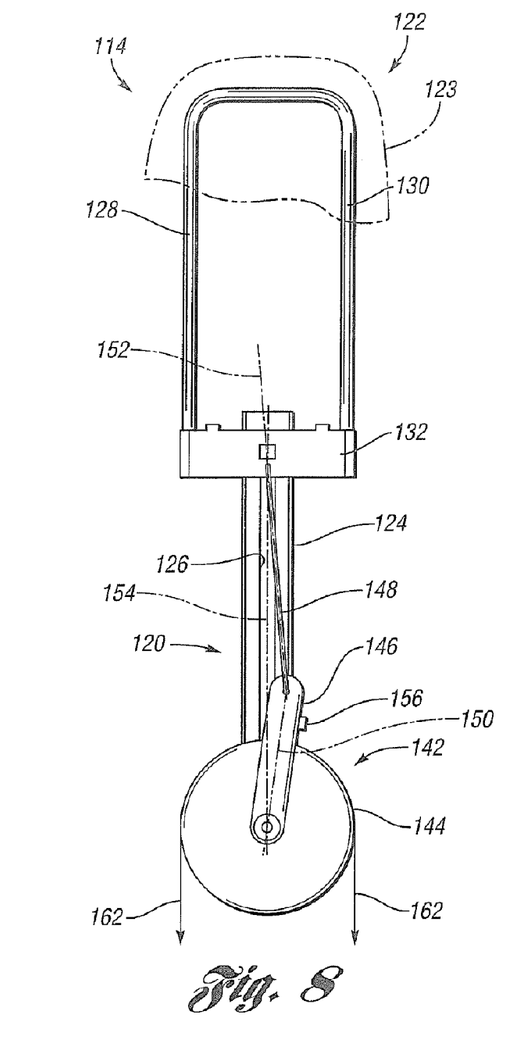
FIG. 8 is a schematic view of the first seat assembly of FIG. 6 showing a drive mechanism for moving the associated head restraint, wherein the head restraint is shown in the raised position.
Figure 9:
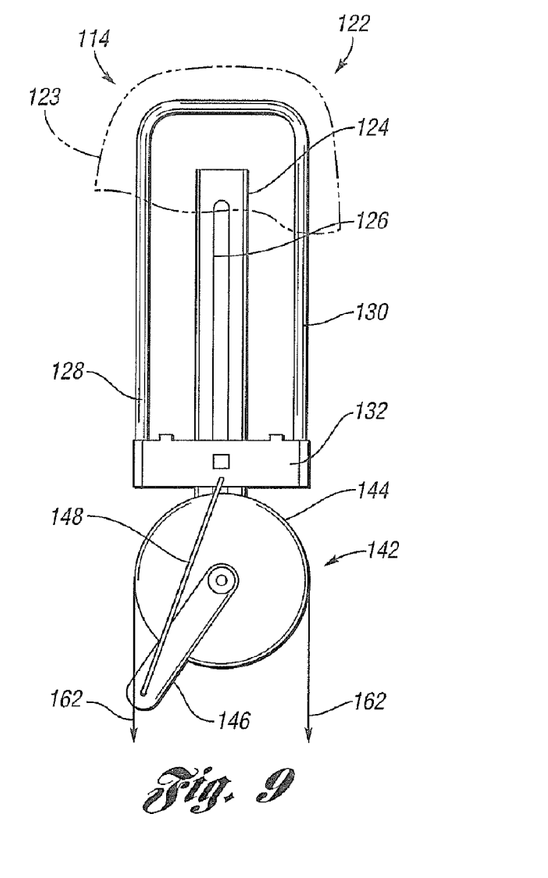
FIG. 9 is a schematic view of the first seat assembly of FIG. 6 showing the head restraint in the lowered position.

Referring to FIGS. 8 and 9, a detailed description of the seat assembly 114 will now be provided, with the understanding that the seat assembly 116 may have the same or similar construction. In the embodiment shown in FIG. 8, the seat back 120 of the seat assembly 114 includes a longitudinal track 124 having a slot 126. In one embodiment, for example, the track 124 may be fixed to a seat back frame (not shown) of the seat back 120. In addition, the head restraint 122 includes first and second support posts 128 and 130, respectively, that support the head restraint body 123 and that are attached to a post carrier 132, which is configured to ride along the slot 126. For example, the carrier 132 may have a projection (not shown) that extends into the slot 126 such that the projection is slidable along the slot 126.

Figure 10:
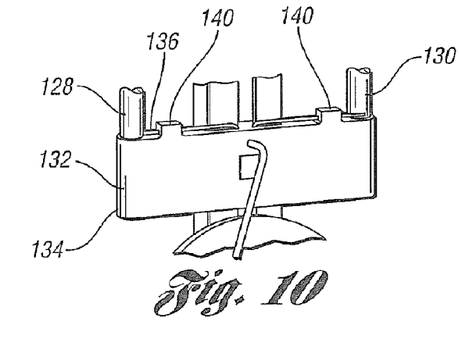
FIG. 10 is an enlarged perspective view of a portion of the first seat assembly of FIG. 6 showing first and second posts of the head restraint connected to a carrier having a carrier body and a retainer member.
Figure 11:
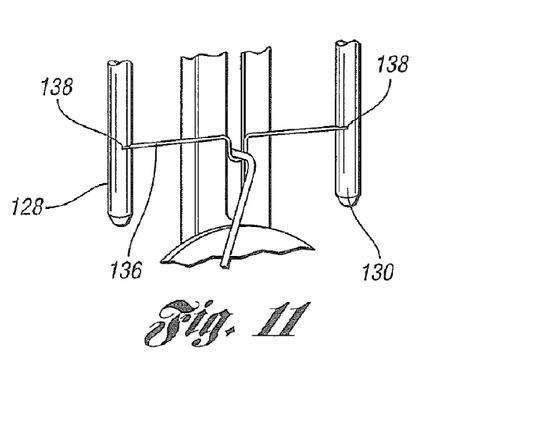
FIG. 11 is an enlarged perspective view similar to FIG. 10 with the carrier body removed to show the retainer member.

While the posts 128 and 130 may be attached to the carrier 132 in any suitable manner, in the embodiment shown in FIGS. 10 and 11, the carrier 132 includes a carrier body 134 having oversized cylindrical holes or tapered holes for receiving the posts 128 and 130, and a retainer member 136, such as a wire, for retaining the posts 128 and 130 in the holes of the carrier body 134. As shown in FIG. 11, the retainer member 136 may engage a notch 138 in each post 128, 130, and the carrier body 134 may include clips 140 that engage the retainer member 136 to secure the retainer member 136 to the carrier body 134.

The carrier 132 may also be configured to accommodate multiple different head restraint configurations, such as configurations having posts 128 and 130 that are spaced apart at different distances. For example, the carrier body 134 may have multiple holes for accommodating different post spacings. As another example, the carrier body 134 may include first and second portions that may be adjustably spaced apart at different distances.

Returning to FIGS. 8 and 9, the seat assembly 114 further includes a drive mechanism 142 for moving the head restraint 122 with respect to the track 124. While the drive mechanism 142 may have any suitable configuration, in one embodiment, the drive mechanism 142 includes a rotatable member 144, such as a pulley, a crank 146 attached to the rotatable member 144, and a link member 148, such as a link rod or arm, having a first end connected to the crank 146 and a second end connected to the carrier 132. When the rotatable member 144 is rotated in a first direction, such as counter-clockwise, the head restraint 122 may be moved generally linearly from the raised position shown in FIG. 8 to the lowered position shown in FIG. 9. Furthermore, when the rotatable member 144 is rotated in a second direction, such as clockwise, the head restraint 122 may be moved from the lowered position to the raised position shown in FIG. 8. Thus, the link member 148 is configured to transfer rotational motion of the rotatable member 144 into linear motion of the head restraint 122.

When the head restraint 122 is in the raised position, the crank 146 is rotated past a vertical position such that a crank axis 150 of the crank 146 and a link member axis 152 of the link member 148 each extend at an angle with respect to a track axis 154 of the track 124, as shown in FIG. 8. With such a configuration, the crank 146 is moved "over-center" to maintain the head restraint 122 in the raised position even with application of a downward force on the head restraint 122. For example, the crank axis 150 may extend at an angle of at least 2 degrees with respect to the track axis 154.

The seat back 114 may further include a stop 156 that is engageable with the rotatable member 144 and/or crank 146 to inhibit movement of the rotatable member 144 in the second direction. The stop 156 may be attached to the seat back frame (not shown) of the seat back 120, for example.

The seat assembly 114 further includes first and second actuators 158 and 160, respectively, connected to the rotatable member 144 for rotating the rotatable member 144. Each actuator 158 and 160, which may be a lever, strap, knob, or push button, for example, may be connected to the rotatable member 144 with a connector 162, such as a cable. Furthermore, referring to FIGS. 6 and 7, each actuator 158 and 160 is located proximate a front portion 164 of the seat bottom 118 such that the actuators 158 and 160 are accessible by an occupant of the driver seat or other front row seat. In the embodiment shown in FIGS. 6 and 7, for example, the actuators 158 and 160 are mounted on, or otherwise disposed proximate to, a front portion of seat bottom frame 166.

When the first actuator 158 is actuated, the rotatable member 144 rotates in the first direction and causes the head restraint 122 to move from the raised position to the lowered position. When the second actuator 160 is actuated, the rotatable member 144 rotates in the second direction and causes the head restraint 122 to move from the lowered position to the raised position. Alternatively, the second actuator 160 may be eliminated, and the head restraint 122 may be moved from the lowered position to the raised position by manually pushing on the head restraint 122.

Because the drive mechanism 142 may be configured to maintain the head restraint 122 in the raised position, as described above in detail, the drive mechanism 142 may act as a locking mechanism for inhibiting downward movement of the head restraint 122. Furthermore, the actuator 158 and associated connector 162 may be considered a release mechanism for moving the drive mechanism 142 from the locked position.

For seat assembly 116, the associated actuators 158 and 160 may each be connected to both head restraints 122 using suitable connectors, such as cables. As a result, actuator 158 of seat assembly 116 may be used to lower both head restraints 122, while actuator 160 may be used to raise both head restraints 122.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly disposable in a vehicle rearward of a front seat, the seat assembly comprising:
   a seat bottom;
   a seat back attached to the seat bottom;
   a head restraint attached to the seat back and including a head restraint body that is moveable from a raised position to a lowered position;
   a locking mechanism associated with the head restraint for maintaining the head restraint body in the raised position; and
   an actuator associated with the locking mechanism and configured to release the locking mechanism to enable movement of the head restraint body from the raised position to the lowered position, the actuator being located proximate a front portion of the seat bottom such that the actuator is accessible by an occupant of the front seat when the seat assembly is installed in the vehicle;
   wherein the seat assembly further comprises an additional head restraint attached to the seat back and including an additional head restraint body that is moveable from a raised position to a lowered position, and an additional locking mechanism associated with the additional head restraint for maintaining the additional head restraint body in the raised position, and wherein the actuator is associated with the additional locking mechanism for releasing the additional locking mechanism to enable the additional head restraint body to move toward the lowered position.

2. The seat assembly of claim 1 wherein the seat bottom includes a seat bottom frame and a cushion supported by the seat bottom frame, and wherein the actuator is mounted on the seat bottom frame.

3. The seat assembly of claim 1 wherein the actuator comprises a lever.

4. The seat assembly of claim 1 wherein the actuator comprises a strap.

5. The seat assembly of claim 1 wherein the actuator comprises a push button.

6. The seat assembly of claim 1 further comprising a connector connected between the actuator and the locking mechanism, and an additional connector connected between the actuator and the additional locking mechanism, and wherein the connectors have different lengths such that the actuator may be used to selectively release the locking mechanisms.

7. The seat assembly of claim 1 further comprising a main connector extending from the actuator to the seat back, and first and second branch connectors connected to the main connector, the first and second branch connectors further being connected to the locking mechanism and the additional locking mechanism, respectively.

8. The seat assembly of claim 1 wherein the head restraint body pivots forwardly when the head restraint body moves from the raised position toward the lowered position.

9. The seat assembly of claim 1 wherein the head restraint body moves generally linearly when the head restraint body moves from the raised position toward the lowered position.

10. The seat assembly of claim 1 wherein the seat back includes a track having a longitudinal track axis, and the head restraint is moveably attached to the track such that the head restraint is moveable longitudinally along the track.

11. The seat assembly of claim 10 further comprising a rotatable member and a link member having a first end connected to the rotatable member and a second end connected to the head restraint, the link member being configured to transfer rotational motion of the rotatable member into linear motion of the head restraint, and wherein the actuator is associated with the rotatable member and is configured to initiate rotation of the rotatable member in a first direction to thereby allow the head restraint body to move from the raised position to the lowered position.

12. The seat assembly of claim 1 wherein the head restraint is slidably attached to the seat back, and the seat assembly further includes a drive mechanism connected between the actuator and the head restraint for moving the head restraint body upon actuation by the actuator.

13. The seat assembly of claim 1 wherein the actuator is located on the front portion of the seat bottom.

14. A seat assembly disposable in a vehicle rearward of a driver seat, the seat assembly comprising:
    a seat bottom;
    a seat back attached to the seat bottom;
    a head restraint attached to the seat back and including a head restraint body that is moveable from a raised position to a lowered position;
    a locking mechanism associated with the head restraint for maintaining the head restraint body in the raised position, the locking mechanism including a locking member that is movable between an engaged position, for locking the head restraint body in the raised position, and a disengaged position; and
    a release mechanism associated with the locking mechanism and configured to release the locking mechanism such that the locking member moves from the engaged position to the disengaged position to enable the head restraint body to move toward the lowered position, the release mechanism including an actuator that is located on the seat bottom proximate a front portion of the seat bottom such that the actuator is accessible by an occupant of the driver seat when the seat assembly is installed in the vehicle.

15. The seat assembly of claim 13 wherein the actuator is located on the front portion of the seat bottom.

16. A vehicle seat assembly disposable in a vehicle rearward of a front seat, the seat assembly comprising:
    a seat bottom;
    a seat back attached to the seat bottom and including a track having a longitudinal track axis;
    a head restraint moveably attached to the track of the seat back such that the head restraint is moveable longitudinally along the track, the head restraint including a head restraint body that is moveable from a raised position to a lowered position;
    a rotatable member
    a link member having a first end connected to the rotatable member and a second end connected to the head restraint, the link member being configured to transfer rotational motion of the rotatable member into linear motion of the head restraint; and
    an actuator associated with the rotatable member and configured to initiate rotation of the rotatable member in a first direction to thereby enable the head restraint body to move from the raised position to the lowered position, the actuator being located proximate a front portion of the seat bottom such that the actuator is accessible by an occupant of the front seat when the seat assembly is installed in the vehicle.

17. The seat assembly of claim 15 wherein the link member has an axis that extends at an angle with respect to the track axis when the head restraint body is in the raised position and the link member is in a locked position.

18. The seat assembly of claim 15 wherein the head restraint includes a support post supporting the head restraint body, and a post carrier connected to the support post, and wherein the second end of the link member is connected to the post carrier.

19. The seat assembly of claim 17 further comprising an additional actuator associated with the rotatable member and configured to initiate rotation of the rotatable member in a second direction opposite the first direction to thereby move the head restraint body from the lowered position to the raised position.

20. The seat assembly of claim 15 further comprising an additional actuator associated with the rotatable member and configured to initiate rotation of the rotatable member in a second direction different than the first direction to thereby enable movement of the head restraint body from lowered position to the raised position.

21. The seat assembly of claim 15 further comprising an additional head restraint attached to the seat back and including an additional head restraint body that is moveable from a raised position to a lowered position, wherein the actuator is associated with the additional head restraint and is configured to enable the additional head restraint body to move from the raised position toward the lowered position.

22. The seat assembly of claim 16 wherein the actuator is located on the front portion of the seat bottom.

* * * * *

UNITED STATES PATENT AND TRADEMARK OFFICE
CERTIFICATE OF CORRECTION

PATENT NO. : 7,484,808 B2  Page 1 of 1
APPLICATION NO. : 10/907503
DATED : February 3, 2009
INVENTOR(S) : Nagarjun V. Yetukuri et al.

It is certified that error appears in the above-identified patent and that said Letters Patent is hereby corrected as shown below:

Column 7, Line 51, Claim 15:
Delete "13" and insert -- 14 --.

Column 8, Line 23, Claim 17:
Delete "15" and insert -- 16 --.

Column 8, Line 27, Claim 18:
Delete "15" and insert -- 16 --.

Column 8, Line 32, Claim 19:
Delete "17" and insert -- 18 --.

Column 8, Line 38, Claim 20:
Delete "15" and insert -- 16 --.

Column 8, Line 44, Claim 21:
Delete "15" and insert -- 16 --.

Signed and Sealed this

Twenty-first Day of April, 2009

JOHN DOLL
*Acting Director of the United States Patent and Trademark Office*